A. HAUBER.
APPARATUS FOR CLEANING FISH.
APPLICATION FILED JULY 14, 1914.
1,134,529.
Patented Apr. 6, 1915.
2 SHEETS—SHEET 1.
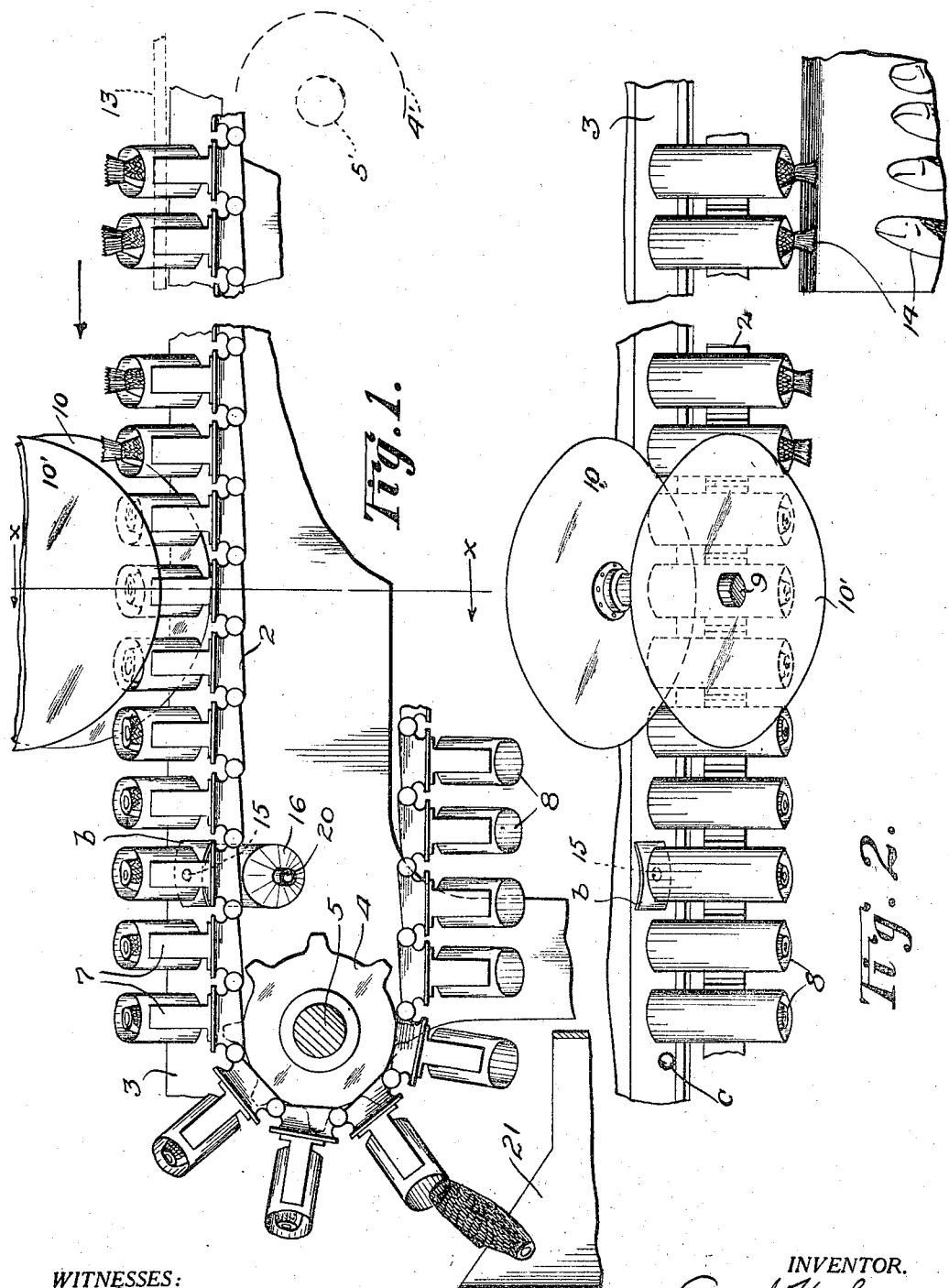

A. HAUBER.
APPARATUS FOR CLEANING FISH.
APPLICATION FILED JULY 14, 1914.
1,134,529.
Patented Apr. 6, 1915.
2 SHEETS—SHEET 2.
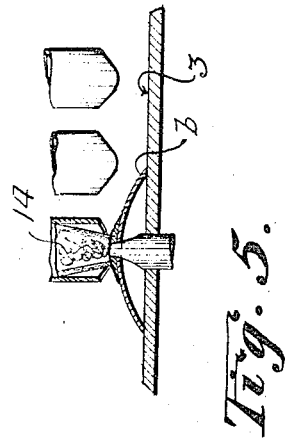
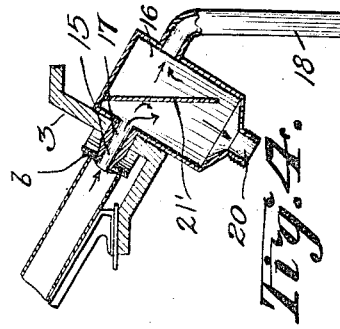
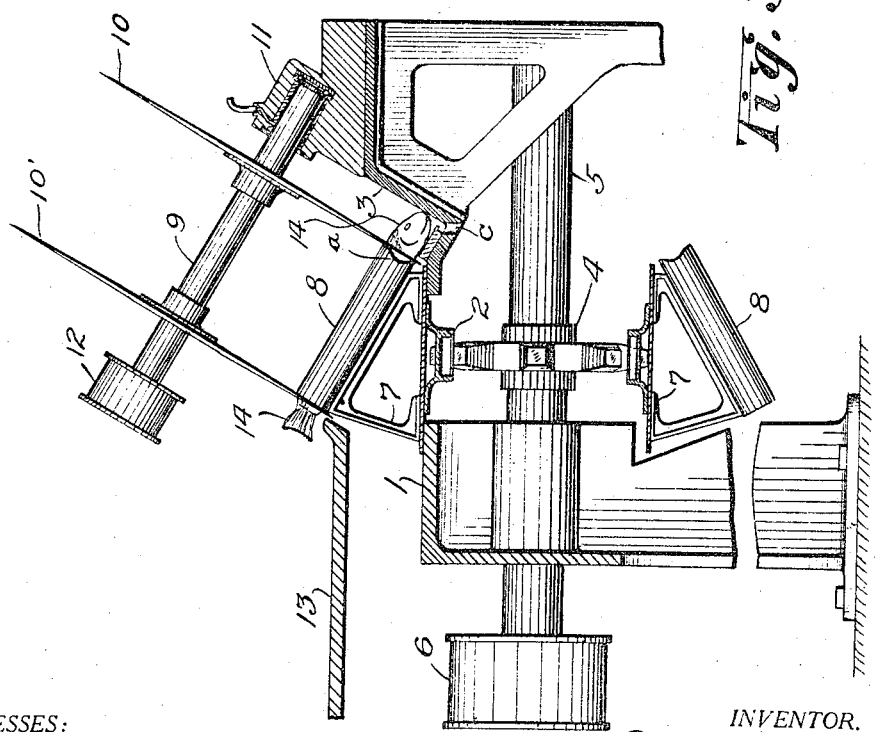
WITNESSES:
INVENTOR.
August Hauber
BY
ATTORNEYS.

UNITED STATES PATENT OFFICE.

AUGUST HAUBER, OF HAYWARD, CALIFORNIA, ASSIGNOR TO F. E. BOOTH, OF SAN FRANCISCO, CALIFORNIA.

APPARATUS FOR CLEANING FISH.

1,134,529.  Specification of Letters Patent.  Patented Apr. 6, 1915.

Application filed July 14, 1914. Serial No. 850,853.

*To all whom it may concern:*

Be it known that I, AUGUST HAUBER, a citizen of the United States, residing at Hayward, in the county of Alameda and State of California, have invented certain new and useful Improvements in Apparatus for Cleaning Fish, of which the following is a specification.

The present invention relates to an apparatus for the cleaning of fish generally for packing or other purposes, although it is more particularly designed for the cleaning of what is known to the trade as the "Monterey" sardine, a fish running in length from six to ten inches; the object of the invention being to clean or remove the entrails of the fish without mutilating the fish in any manner whatever for packing purposes, while at the same time securing a more perfect cleaning of the fish than by the hand operation of cleaning, and increasing the output over that possible by hand, thus materially reducing the expense incident to the cleaning of the fish by hand and increasing the output of the plant.

To comprehend the invention, reference should be had to the accompanying sheets of drawings, wherein—

Figure 1 is a part broken view, in side elevation, of the apparatus, illustrating the endless carrier with the holders for the fish, the position of the cutting devices relative to the fish runway, and the suction means for withdrawing the entrails from the fish. Fig. 2 is a top plan view of the parts disclosed by Fig. 1 of the drawings. Fig. 3 is a vertical sectional end view of the apparatus taken on line *x—x*—Fig. 1 of the drawings, and viewed in the direction of the arrow. Fig. 4 is a detail vertical sectional view of the suction container for receiving the withdrawn entrails, with the suction pump applied thereto. Fig. 5 is a detail view illustrating one of the holders with the fish therein positioned for the action of the suction means. Fig. 6 is a detail end view of one of the holders for the fish to be cleaned.

In the drawings, the numeral 1 is used to designate the runway for the endless carrier 2, said runway at one side thereof being provided with a guard wall 3. The endless carrier 2 works over the sprocket wheels 4 and 4' mounted on the shafts 5 and 5' located respectively at each end of the runway 1, rotation being imparted to shaft 5 by means of a power driven belt (not shown) working over a belt pulley 6 secured to the projecting end of said shaft.

From the endless carrier 2 upwardly projects a series of spaced supports or brackets 7, each being in the present case inclined toward the guard wall 3, and to each of said brackets is secured a transversely disposed holder 8 for the fish to be operated on. In the present case these holders are illustrated as tubular in form, but the shape thereof is immaterial just so long as they will properly hold the fish placed thereon. Owing to the inclination of the brackets 7, it is obvious that the holders 8 will lie at an inclination to the horizontal, so that when a fish is placed therein the nose of the same will rest against the guard wall 3, which stands at an outward inclination. Within the runway 1 is mounted on a shaft 9 for rotation the spaced cutting disks 10—10', the distance between the cutting disks or blades being such as to permit of the holders 8 passing between the inner walls thereof. In the present case the shaft 9 is mounted within a bearing 11 secured to the upper face of the guard-wall 3, and rotation is imparted thereto by a drive belt (not shown), working over a belt pulley 12 secured to the outer end of the said shaft. However, it will be understood that any suitable means may be employed for imparting high rotative speed to the shaft 9, and equally so that any suitable means may be employed for imparting rotation to the drive-shaft 5 for actuating the endless carrier 2.

To one side of the runway for the endless carrier and in advance of the cutting instrumentalities 10 and 10' is located a platform 13 for the reception of the fish to be cleaned, which fish are piled on said platform and by an attendant, there stationed, fed into the holders 8 as carried by said station by the endless carrier. Each holder is of a length somewhat less than the length of the fish to be cleaned, so that when the fish 14 are placed within the holders the head and tail thereof project beyond the respective ends of the holder, the nose of the fish, due to the inclination of the holder, bearing against the inner face of the guard wall 3. As thus positioned, the tail and head of the fish are moved within the sphere of the cutting instrumentalities by the travel of the endless carrier and as conveyed forwardly the head and tail are severed from the fish, and in this condition the fish is carried toward the suction opening 15 in the guard wall 3 a short distance beyond the sphere of the disks or cutting instrumentalities 10 and 10'. Each holder 8 is slightly cut away, as shown at $a$, so as to ride over the convex surface $b$ in the guard wall 3 adjacent the auction opening 15 thereof, so that the head end portion of the fish will come in perfect registry with the said suction opening during the forward travel of the endless carrier.

The suction opening 15 is connected with a container 16 by a short connection or conduit 17, and by a pipe connection 18 the container 16 is connected to a suction motor 19. This suction motor is in constant action, so the moment the head end of the fish with its severed head is brought into registry with the suction opening 15, the entrails of the fish are drawn through the conduit 17 into the container 16, discharging therefrom through the outlet 20 which leads to a suitable place of deposit. To prevent the entrails entering the connection 18, there is arranged within the container 16 a baffle plate 21', which deflects the inflowing entrails toward the bottom of the said container. Such blood as flows during the severing of the head from the fish, escapes from the runway 1 through the drain outlet $c$, Fig. 3 of the drawings.

Owing to the inclination of the holders 8 during the upper run of the endless carrier the head end of the fish will constantly bear against the inner face of the guard wall 3, the size of the holder being sufficient to permit of free movement of the fish. As the holder with the cleaned fish contained therein is carried by the endless carrier over the sprocket wheel 4, the tail end portion of the fish will be at a downward inclination and the same will slip from within its holder onto the discharge chute 21—Fig. 1 of the drawings.

By the described invention there results a perfect cleaning of the fish and this without mutilation of the same in any manner whatever, the fish being in perfect condition for canning purposes. It will be understood that the fish are separated according to size prior to being acted on by the machine, so that a fish of only proper length for the holders are presented to any given machine. The tails are removed due to the fact that they are useless for eating purposes, and by the severing thereof less material is required to be severed from the head portion for properly adapting the fish for a given size can, thus a greater quantity of meat is secured than where the tails are left on the fish.

While preference is given to cleaning the fish by severing the head and by suction withdrawing the entrails lengthwise from the fish, it is obvious that the same results may be accomplished by cutting into the fish back of the head and presenting the cut portion to the suction means.

I do not wish to be understood as confining or limiting the invention to the details of construction as to the described working parts, being fully aware that the same may be modified and varied without departing from the nature and scope of the invention, which resides in the cleaning of fish by first cutting the same to gain access to the interior thereof, and withdrawing the entrails through such portion of the fish by suction, and it is this feature which it is desired to be understood as claiming broadly.

Having thus described the invention what is claimed as new and desired to protect by Letters Patent is:—

1. An apparatus for the described purpose, the same comprising means for cutting the fish for obtaining access to the interior of the same, suction means for withdrawing the entrails through such cut portion of the fish, and mechanism for presenting the fish successively to said cutting and suction means.

2. An apparatus for the described purpose, the same comprising an endless carrier, spaced holders carried thereby of less length than the fish, means within the path of the carrier for severing the tail and head from the fish within the holder, and suction means within the line of travel of the carrier for withdrawing the entrails through the severed head portion of the fish.

3. An apparatus for the described purpose, the same comprising a runway, an endless carrier working therein, a series of spaced fish holders secured to said carrier, cutting means within the path of the carrier for cutting the fish for obtaining access to the interior thereof, and suction means mounted adjacent to the carrier for withdrawing the entrails from the fish through the cut portion thereof.

4. An apparatus for the described purpose, the same comprising mechanism for the cutting of fish for obtaining access to the interior thereof, suction means for removing the entrails of the fish through the cut portion thereof, and continuously traveling means for successively presenting fish to the cutting mechanism and to the suction means.

5. An apparatus for the described purpose, the same comprising a runway provided with an upwardly inclined guard wall, an endless carrier provided with spaced fish holders working within said runway, cutting means within the runway for cutting the fish within the holders for obtaining access to the interior thereof, a suction outlet in the guard wall of the runway, an entrail container connected with said outlet, and suction means connected with said container.

6. An apparatus for the described purpose, the same comprising a runway with an upwardly inclined guard wall, an endless carrier provided with brackets inclined toward said guard wall, a series of inclined fish holders mounted on said brackets and working within said runway, cutting means within the runway for cutting the fish within the holders for obtaining access to the interior thereof, a suction outlet in the guard wall of the runway, an entrail container connected with said outlet, and suction means connected with said container.

7. In an apparatus for the described purpose, the same comprising means for cutting the fish for obtaining access to the interior thereof, and suction means for withdrawing the entrails through said cut portion, in combination with means for moving the cut fish from the cutting means to the suction means.

8. In an apparatus for the described purpose, the combination with a rotary cutting means, of a carrier for propelling the fish within and out of the sphere of the cutting means, and suction means mounted adjacent the carrier for withdrawing the entrails through the cut portion of the fish.

9. In an apparatus for the cleaning of fish, the same comprising a carrier for the fish to be cleaned, means within the path of the carrier for severing the head from the fish, and suction means mounted adjacent the carrier, acting on the severed head portion of the fish for the removal of the entrails therefrom.

In testimony whereof I have signed my name to this specification in the presence of two subscribing witnesses.

AUGUST HAUBER.

Witnesses:
HARRY A. TOTTEN,
D. B. RICHARDS.